2,847,419
PROPYNYL DITHIOCARBAMATES

Marion W. Harman, Nitro, and John J. D'Amico, Charleston, W. Va., assignors to Monsanto Chemical Company, St. Louis, Mo., a corporation of Delaware No Drawing. Application November 26, 1954
Serial No. 471,505

10 Claims. (Cl. 260—313)

The present invention relates to the manufacture of dithiocarbamates and to the products thereby obtained. More particularly the invention relates to those dithiocarbamates containing a propynyl group and specifically to the propynyl esters of dithiocarbamic acid. Such products embrace a new class of chemical compounds which may be readily produced by the methods set forth in the various examples shown of the invention.

As is well known, the dithiocarbamates contain the common group

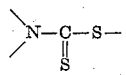

and in the present invention, the propynyl group, $-CH_2 \cdot C \equiv CH$ is attached to the terminal sulfur atom. Hence the products may be described as esters. In brief, these products are obtained by reacting a soluble salt, for example a water solution of an alkali metal salt of a dithiocarbamate with a monohalogen substituted propyne.

*Example 1.*—To 778 parts (1.0 mole) of an 18% by weight aqueous solution of sodium dimethyl dithiocarbamate there were added 119 parts (1.0 mole) of 3-bromo-1-propyne. An exothermic reaction occurred almost immediately and the temperature rose within 5 minutes from room temperature to about 50° C. The reaction mixture was then stirred for about 5 hours. Thereupon the solid reaction product was filtered off, washed with water until the washings were neutral to litmus and then air dried at room temperature. The product which melted at 56–57° C. was obtained in 93% theory yield. Analysis of the product of empirical formula $C_6H_9NS_2$ gave the following result:

|  | Theory | Found |
|---|---|---|
|  | Percent | Percent |
| Nitrogen | 8.79 | 8.77 |
| Sulfur | 40.26 | 40.26 |

*Example 2.*—Following the procedure set forth in Example 1, an aqueous solution of sodium diethyl dithiocarbamate was reacted with 3-bromo-1-propyne in equimolar quantity. In this case the product was oily and was ether and water washed to neutrality and dried over anhydrous sodium sulfate and the ether removed in vacuo. The amber colored oil of empirical formula $C_8H_{13}NS_2$ obtained in 84.5% theory yield, analyzed as follows:

|  | Theory | Found |
|---|---|---|
|  | Percent | Percent |
| Nitrogen | 7.48 | 7.16 |
| Sulfur | 34.24 | 34.32 |

*Example 3.*—Following the procedure of Example 2, a water solution of sodium dibutyl dithiocarbomate was reacted with an equimolar quantity of 3-bromo-1-propyne. An amber colored oil was obtained in 89% theory yield. Analysis of the product of empirical formula $C_{12}H_{21}NS_2$ showed

|  | Theory | Found |
|---|---|---|
|  | Percent | Percent |
| Nitrogen | 5.75 | 5.87 |
| Sulfur | 26.35 | 26.10 |

*Example 4.*—A mixture of 50.6 parts (0.5 mole) of di-n-propylamine in 400 parts of water, 80 parts (0.5 mole) of 25% caustic soda solution, 38 parts (0.5 mole) of carbon disulfide was reacted to form a dithiocarbamate and then treated with 59.5 parts (0.5 mole) of 3-bromo-1-propyne and agitated at room temperature for 24 hours. An amber colored oil was obtained and was treated as shown in Example 2. The product was obtained in 89% yield of theory and on analysis showed 7.00% nitrogen and 29.18% sulfur, thereby confirming the formula of the product as $$(CH_3.CH_2.CH_2)_2NC(S)SCHC \equiv CH$$

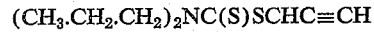

with empirical formula $C_{10}H_{17}NS_2$ and containing 6.50% nitrogen and 29.77% sulfur.

*Example 5.*—A variation in the procedure was followed in reacting 3-chloro-1-propyne with sodium diisopropylamine dithiocarbamate. The propynyl ester obtained, having the formula $[(CH_3)_2CH]_2N.C(S)SCH_2C \equiv CH$, was produced by adding 76 parts (1 mole) of carbon disulfide, at a slow rate while maintaining a temperature of 20–25° C. to a mixture of 101.2 parts (1 mole) of diisopropylamine, 1000 parts of water and 160 parts (1 mole) of 25% caustic soda solution. After agitating for an hour there were added 74.5 parts (1 mole) of 3-chloro-1-propyne and agitation continued for about 3 hours while keeping the temperature at 50–60° C. After cooling to room temperature, the mixture was ether extracted, the ether extract was washed with water to neutrality and then dried over anhydrous sodium sulfate. The amber liquid product was obtained in 83.2% theory yield and was found to contain 6.28% nitrogen and 29.36% sulfur. This confirms the product to be that shown which contains 6.50% nitrogen and 29.77% sulfur.

*Example 6.*—Following the procedure described in Example 5, but employing 48.3 parts (0.2 mole) of di-2-ethylhexyl amine in 500 parts of water with corresponding equimolar parts of caustic soda, carbon disulfide and 3-bromo-1-propyne, there was obtained an amber colored oil in 90.1% theory yield of the propyne ester of formula

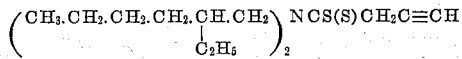

Analysis of the product showed 3.93% nitrogen and 17.65% sulfur as compared respectively with 3.94% nitrogen and 18.03% sulfur as theory content of the formula shown above.

*Example 7.*—Again following the procedure of Example 5, and employing equimolar parts by weight of diallylamine and of the other ingredients of Example 5, except for amine as shown, there was produced an amber oil in 84.5% theory yield for the product

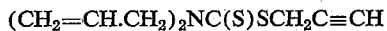

$$(CH_2 = CH.CH_2)_2NC(S)SCH_2C \equiv CH$$

Analysis of the product resulted in 6.00% nitrogen and 30.23% sulfur with theoretical content of these elements respectively 6.63% and 30.34% calculated for the formula $C_{10}H_{13}NS_2$.

*Example 8.*—Again following the procedure of Example 5 and employing equimolar weight parts of the ingredients shown except substituting N-isopropyl allylamine for the isopropylamine of Example 5, there was obtained an amber oil in 89.1% theory yield of the product,

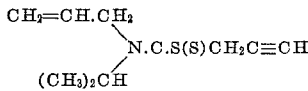

The product was analyzed and found to contain 6.49% nitrogen and 29.56% sulfur as compared with 6.57% nitrogen and 30.60% sulfur for the molecular formula $C_{10}H_{15}NS_2$.

*Example 9.*—In place of the sodium dimethyldithiocarbamate of Example 1, a suspension of 47.1 parts (0.25 mole) of 3(cyclohexylamino)propionamide hydrate in 500 parts of water and 40 parts (0.25 mole) of 25% caustic soda was employed and reacted with 19 parts (0.25 mole) of carbon disulfide and 29.8 parts (0.25 mole) of 3-bromo-1-propyne. The procedure of Example 1 was followed and the following product obtained:

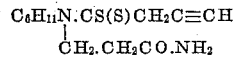

The product, melting at 124–126° C., was obtained in 92.9% theory yield. Analysis of the product gave the following results: Nitrogen 9.83%, sulfur 22.50%. Calculated results for the molecular formula $C_{13}H_{20}N_2OS_2$ are 9.85% nitrogen and 22.54% sulfur.

*Example 10.*—Again following the procedure of Example 5 but employing pyrrolidine (tetramethyleneimine) in place of the diisopropylamine there shown, and charging equimolar proportions of the other reactants there set forth, there was obtained a semi-solid product in 76.6% theory yield of the formula

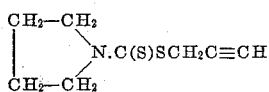

Analysis of the product gave as results 7.23% nitrogen and 34.40% sulfur while calculated quantities for the molecular formula $C_8H_{11}NS_2$ required by theory 7.56% nitrogen and 34.61% sulfur.

*Example 11.*—In place of pyrrolidine used in Example 10, there was substituted 4-phenyl-piperazine and the procedure of Example 5 followed. There was obtained an amber oil in 94.5% theory yield of the product

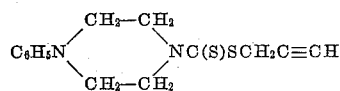

For the molecular formula $C_{14}H_{16}N_2S_2$, theory requires 10.14% nitrogen. Analysis gave 9.81%.

*Example 12.*—In place of pyrrolidine employed in Example 10, there was substituted N,N'-diisopropyl-2-butene-1,4-diamine and the procedure of Example 5 followed. There was obtained a viscous amber colored oil in 88.5% theory yield of the product,

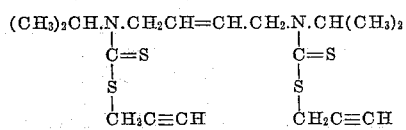

For the molecular formula $C_{18}H_{26}N_2S_4$ theory requires 7.03% nitrogen. Found 6.82%.

*Example 13.*—A sodium salt of a dithiocarbamate was prepared in the well known way by reacting 2,5-dimethyl piperazine with carbon disulfide in caustic soda solution. In this instance 0.25 pound mole of the amine was combined with 0.50 pound mole of the two other reactants. Following the procedure of Example 1, and reacting the dithiocarbamate with 3-bromo-1-propyne there was obtained a tan colored solid in 99% theory yield melting above 300° C. For the molecular formula $C_{14}H_{18}N_2S_4$ theory requires 8.18% nitrogen. By analysis of the product there was found 7.90% nitrogen.

*Examples 14–17.*—A group of four propynyl esters of chloro alkenyl N-substituted dithiocarbamates were prepared by following the procedure of Example 5, and employing as the starting amines the following: N-2-chloro-allylcyclohexylamine of the formula:

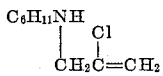

3-chloro-2-butenylcyclohexylamine of the formula:

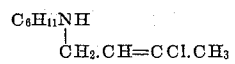

2-chloro-N-isopropylallylamine of the formula:

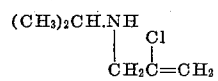

and bis(2-chloroallylamine) of the formula:

$(CH_2{:}CClCH_2)_2NH$

In all instances amber colored oils were obtained in yields of from 81 to 95% theory, all of which, on analysis for nitrogen and sulfur, and for chlorine when present, checked within experimental error to demonstrate that the expected products were formed.

From the numerous examples of the invention set forth heretofore, it is apparent that the propynyl esters described comprise an extensive class of products and may be produced from dithiocarbamates formed from alkyl and cyclic amines, both saturated and unsaturated.

The new compounds are valuable intermediates. In addition to the high degree of unsaturation the compounds have a reactive center by virtue of an active hydrogen in the propynyl group. Moreover, the compounds useful herbicides, accelerators for the vulcanization of rubber, antiseptics, fungicides and have other uses.

It is intended to cover all changes and modifications of the invention herein chosen for purposes of disclosure which do not constitute departures from the spirit and scope of the invention.

What is claimed is:

1. A propynyl ester of a nonaromatic dithiocarbamic acid.
2. A propynyl ester of an alkyl dithiocarbamic acid.
3. A propynyl ester of a cyclic dithiocarbamic acid.
4. A dithiocarbamate containing at least one but not more than two of the

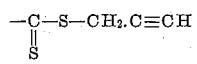

group the dangling valences on the nitrogen being satisfied by nonaromatic hydrocarbon.

5. A dithiocarbamate containing the

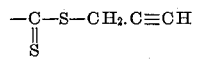

group attached to the nitrogen of an amino radical the valences of which nitrogen are satisfied by an acyclic hydrocarbon radical and a chloroalkenyl group.

6. The propynyl ester of the structure

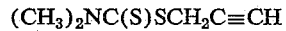

7. The propynyl ester of the structure
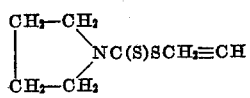
8. 2-propynyl diethyldithiocarbamate.
9. 2-propynyl diallyldithiocarbamate.
10. 2-propynyl N-(2-chloroallyl)isopropyldithiocarbamate.
References Cited in the file of this patent
UNITED STATES PATENTS
| | | |
|---|---|---|
| 2,127,375 | Bousquet | Aug. 16, 1938 |
| 2,637,696 | Kirshenbaum et al. | May 5, 1953 |
FOREIGN PATENTS
| | | |
|---|---|---|
| 1,079,916 | France | May 26, 1954 |
OTHER REFERENCES
V. Braun, Ber. Deut. Chem. 35, page 3381 (1902).

UNITED STATES PATENT OFFICE
Certificate of Correction

August 12, 1958

Patent No. 2,847,419

Marion W. Harman et al.

It is hereby certified that error appears in the printed specification of the above numbered patent requiring correction and that the said Letters Patent should read as corrected below.

Column 2, line 56, Example 6, for that portion of the formula reading column 3, line 11, Example 8, for that portion of the formula reading

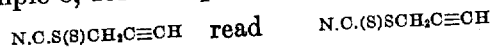

same Example 8, line 16, for "30.60%" read —30.06%—; same column 3, lines 27 and 28, Example 9, for that portion of the formula reading

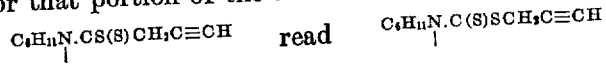

column 4, lines 61 to 63, for

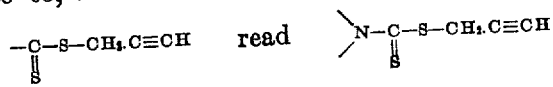

Signed and sealed this 21st day of October 1958.

[SEAL]

Attest:
KARL H. AXLINE,
*Attesting Officer.*

ROBERT C. WATSON,
*Commissioner of Patents.*